US007069287B2

(12) United States Patent
Paar et al.

(10) Patent No.: US 7,069,287 B2
(45) Date of Patent: Jun. 27, 2006

(54) METHOD FOR EFFICIENT COMPUTATION OF ODD CHARACTERISTIC EXTENSION FIELDS

(75) Inventors: Christof Paar, Cologne (DE); Adam D Woodbury, Billerica, MA (US); Daniel V Bailey, Burlington, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 833 days.

(21) Appl. No.: 09/956,755

(22) Filed: Sep. 19, 2001

(65) Prior Publication Data

US 2002/0062330 A1 May 23, 2002

Related U.S. Application Data

(60) Provisional application No. 60/233,683, filed on Sep. 19, 2000.

(51) Int. Cl.
*G06F 7/00* (2006.01)

(52) U.S. Cl. .......................................... 708/492; 380/28
(58) Field of Classification Search ................ 708/492; 380/28, 30
See application file for complete search history.

(56) References Cited

U.S. PATENT DOCUMENTS

| 5,999,959 | A | 12/1999 | Weng et al. | |
| 6,049,815 | A | 4/2000 | Lambert et al. | |
| 6,230,179 | B1 | 5/2001 | Dworkin et al. | |
| 6,252,959 | B1 | 6/2001 | Paar et al. | |
| 6,377,969 | B1 | 4/2002 | Orlando et al. | |
| 6,611,597 | B1* | 8/2003 | Futa et al. | 708/492 |
| 2002/0041681 | A1* | 4/2002 | Hoffstein et al. | 380/28 |
| 2002/0055962 | A1* | 5/2002 | Schroeppel | 708/492 |

OTHER PUBLICATIONS

Preda Mihailescu, "Optical Galois Field Bases which are not Normal", presentation (Recent Results Session), FSE '97 (Fast Software Encryption), Jan. 20-22, 1997, Haifa, Israel.
D.V. Bailey et al., "Optimal Extension Fields for Fast Arithmetic in Public-Key Algorithms", Advances in Cryptology-CRYPTO '98, ed. H.Krawczyh, Lecture Notes in Computer Science 1462, Springer-Verlag (Heidelburg 1998), p 472-485.
Anonymous, "The Elliptic Curve Cryptosystem for Smart Cards", Certicom White Paper, Certicom Corp., San Mateo, CA (May 1998).
T. Kobayashi et al., "Fast Elliptic Curve Algorithm Combining Frobenius Map and Table Reference to Adapt to Higher Characteristic", Advances in Cryptology-EUROCRYPT '99, ed. J. Stern, Lecture Notes in Computer Science 1592, Springer-Verlag (Berlin 1999), p176-189.
J.W. Chung et al., "Fast Implementation of Elliptic Curve Defined over GF(p**m) on Calm RISC with MAC2424 Coprocessor", Cyrptographic Hardware and Embedded Systems-CHES 2000, ed. C.K. Koc et al., Lecture Notes in Computer Science 1965, Springer-Verlag (Berlin 2000), p57-70.
J. Guajardo et al., "Efficient Implementation of Elliptic Curve Cryptosystmes on the TI MSP430x33x Family of Microcontrollers", PKC 2001, ed. K. Kim, Lecture Notes in Computer Science 1992, Springer-Verlag (Berlin 2001), p 365-382.
D.V. Bailey et al., "Efficient Arithmetic in Finite Field Extensions with Application in Elliptic Curve Crytopgraphy", J. Cryptology, 14(3): 153-176 (2001).

* cited by examiner

*Primary Examiner*—Tan V. Mai
(74) *Attorney, Agent, or Firm*—R. Dennis Greehan, Esq.

(57) ABSTRACT

A method for implementing an elliptic curve or discrete logarithm cryptosystem on inexpensive microprocessors is disclosed which provides for advantageous finite field computational performance on microprocessors having limited computational capabilities. The method can be employed with a variety of commercial and industrial imbedded microprocessor applications such as consumer smart cards, smart cards, wireless devices, personal digital assistants, and microprocessor controlled equipment. In one embodiment, a Galois Field (GF) implementation based on the finite field $GF((2^8-17)^{17})$ is disclosed for an Intel 8051 microcontroller, a popular commercial smart card microprocessor. The method is particularly suited for low end 8-bit and 16-bit processors either with or without a coprocessor. The method provides for fast and efficient finite field multiplication on any microprocessor or coprocessor device having intrinsic computational characteristics such that a modular reduction has a greater computational cost than double precision, long number additions or accumulations. The disclosed method offers unique computational efficiencies in requiring only infrequent subfield modular reduction and in employing an adaptation of Itoh and Tsujii's inversion algorithm for the group operation. In one embodiment, a core operation for a signature generation, an elliptic curve scalar multiplication with a fixed point, is performed in a group of order approximately $2^{134}$ in less than 2 seconds. In contrast to conventional methods, the method does not utilize or require curves defined over a subfield such as Koblitz curves.

20 Claims, No Drawings

METHOD FOR EFFICIENT COMPUTATION OF ODD CHARACTERISTIC EXTENSION FIELDS

CROSS-REFERENCES

This application is related to co-pending U.S. provisional patent Application U.S. Ser. No. 60/233,683 filed on Sep. 19, 2000.

FIELD OF THE INVENTION

This invention relates generally to methods for fast and efficient finite field computations for implementation of elliptic curve and discrete logarithm cryptosystems on microprocessors having limited computational capabilities. More particularly, this invention relates to a method for rapid and efficient finite field multiplication and squaring of both odd characteristic extension fields $GF(p^m)$, where $p>2$ and $m>1$, and optimal extension fields for both prime integers, where $p=2^n-c$, and irreducible polynomials, where $p(x)=x^m-k_0$.

BACKGROUND OF THE INVENTION

Recently, large scale commercial deployment of smart cards has become commonplace in industrial, retail banking and consumer credit card applications which require affordable, efficient and secure smart card devices and readers. Due to the considerable monetary values and large scale associated with widespread smart card deployments, the success of such applications is dependent on both acceptable deployment costs and transaction security.

Typically, smart cards are manufactured with low end microprocessors having relatively slow speed, short bit lengths and limited cache and memory so as to minimize card production costs. Smart card security features typically include digital signatures, data encryption and public-key operations which require long number arithmetic. Naccache et al. [see D. Naccache and D. M'Raïhi, "Cryptographic smart cards", *IEEE Micro,* 16(3):14–24, 1996] have provided an overview of commercial smart cards with cryptographic capabilities, including a discussion of general implementation concerns on various types of smart cards. Naccache and co-workers [see D. Naccache, D. M'Raïhi, W. Wolfowicz, and A. di Porto. "Are crypto-accelerators really inevitable?", *Advances in Cryptography—EUROCRYPT '95,* ed. L. Guillou et al., Lecture Notes in Computer Science, vol. 921, Springer-Verlag (New York 1995) pp. 404–409] disclosed an early implementation of a 20-bit, zero-knowledge identification system on a 4 MHz Thomson ST16623 microprocessor. Many current generation commercial smart cards use 8-bit microcontrollers derived from 1970s families such as the Intel 8051 [see Sencer Yeralan and Ashutosh Ahluwalia, *Programming and Interfacing the 8051 Microcontroller.* Addison-Wesley (Wellesley, Mass. 1995)] and the Motorola 6805.

The use of commonly available public-key algorithms such as RSA or DSA with these low cost microprocessors typically results in unacceptably long processing delays since the algorithms employed are based on modular arithmetic with very long operands. To address this problem, some smart card microcontroller manufacturers include additional on-chip hardware to accelerate long-number arithmetic operations. However, in large volume, cost-sensitive commercial applications it is preferable to execute public-key operations on smart cards having low cost microprocessors without the addition of a coprocessor. Thus, it is both technically and commercially advantageous to implement a public-key digital signature algorithm which does not introduce smart card performance problems nor require additional hardware beyond that of a typical 8-bit or 16-bit microcontroller.

One attractive solution to this smart card computational problem may be provided by the computational efficiency available with finite field or Galois field arithmetic. Finite fields have important application in many areas of modem communication systems. In particular, arithmetic in finite fields is required for the realization of certain public-key or asymmetric schemes and for certain error correction codes. Additional applications which may advantageously employ finite field arithmetic include signal processing, random number generation and smart appliances. In the area of cryptography, finite filed arithmetic is required in Elliptic Curve Discrete Logarithm Cryptography (herein "ECC") systems and Digital Logarithm (herein "DL") schemes. Both of these methods are classified as public-key schemes and can be utilized for building communication and computer systems which provide enhanced security functions. For example, both methods may be employed for assuring sender authenticity, maintaining integrity of electronic messages through digital signatures, exchanging keys over insecure channels, or identifying the parties which are communicating. An elliptic curve cryptosystem relies on the assumed hardness of the Elliptic Curve Discrete Logarithm Problem (herein "ECDLP") for its security. An instance of the ECDLP is posed for an elliptic curve defined over a finite field $GF(p^m)$ for "p" a prime and "m" a positive integer. The rule to perform the elliptic curve group operation can be expressed in terms of arithmetic operations in the finite field. Thus the speed of the field arithmetic determines the speed of the cryptosystem.

Implementations of elliptic curve cryptography and digital signature algorithm methods have been incorporated into U.S. government digital signature standards FIPS 186-1 and FIPS 182-2. Detailed descriptions of ECC schemes and their applications may be found in Blake et al. (see I. Blake, G. Seroussi and N. Smart, *Elliptic Curves in Cryptography,* London Mathematical Society Lecture Notes, Series 265, Cambridge Univ. Press (Cambridge, England 1999), IEEE draft standard P1363 and ANSI standards X9.62 and X9.63. For DL schemes, detailed descriptions and their applications are found in Menezes et al. [A. J. Menezes, P. C. van Oorschot and S. A. Banstone, *Handbook of Applied Cryptography,* CRC Press (Boca Raton, Fla. 1997)], IEEE draft standard P1363 and ANSI standards X9.30-1 and X9.42.

Certicom Corp. has considered ECC implementations for smart cards [see "The Elliptic Curve Cryptosystem for Smart Cards", Certicom White Paper, http://www.certicom.com/ resources/w_papers/w_papers.html, Certicom Corp. (San Mateo, Calif. 1998)]. A millisecond performance benchmark for digital signatures is reported for an ECC defined over $GF(2^{163})$. Since benchmark data was generated with a Sun UltraSparc I, 64-bit, 167 MHz high performance desktop system with an 83 MHz bus, 1.3 GB/s memory transfer, 128 MB ram and 0.5 to 4 MB external cache and typical smart cards commonly employ low end, 8-bit microprocessors which typically operate at around 4 MHz with approximately 128 to 1024 bytes of RAM, 1–16 KB of EEPROM and 6–16 KB of ROM, the reported results are not immediately applicable to smart cards but demonstrate the computation potential of ECC methods. In a previous draft version (http://www.certicom.ca/ exx/wecc4.htm) of the white paper, Certicom Corp. disclosed benchmarks for an ECC digital signature implementation on Siemens SLE44C80S and 16-bit SLE66C80S microcontroller using Koblitz curves and a binary extension field. The use of these specialized elliptic curves limited computation coefficients to only two values, 0 and 1, thus providing faster computation with less security. Digital signature performances of less than 1.5 seconds was reported for the 8-bit microprocessor and 0.7 seconds for the 16-bit microcontroller.

Chung et al. disclose fast finite field and elliptic curve algorithms for embedding cryptographic functions on a high performance CalmRISC 8bit RISC microcontroller with a MAC2424 24-bit high performance coprocessor capable of both 24-bit and 16-bit operation modes [see J. W. Chung, S. G. Sim and P. J. Lee, "Fast Implementation of Elliptic Curve Defined over GF($p^m$) on Calm RISC with MAC2424 Coprocessor", CHES 2000, ed. C. K. Koq et al., Lecture Notes in Computer Science, vol. 1965, Springer-Verlag (New York 2000) pp. 57–70]. In 24-bit mode, the MAC2424 coprocessor has two 48-bit multiplier accumulators and two 32 Kb×24-bit data memory and, in 16-bit mode, the coprocessor has two 32-bit multiplier accumulators and two 32 Kb×16-bit data memory. Due to the unique hardware capabilities of the MAC2424 coprocessor, the computational cost of multiplication is the same as addition and the multiplication product of two subfield elements can be accumulated multiple times in the accumulator so that long number arithmetic can be performed without intermediate reduction.

It has been long recognized that efficient finite field arithmetic is vital to achieve acceptable performance with ECCs. While in prior ECC implementations, workers have utilized even-characteristic finite fields with composite extension degree, recent attacks on the security of such approaches has rendered them unattractive. In alternative approaches, some workers such as De Win et al. [see E. De Win, A. Bosselaers, S. Vandenberghe, P. De Gersem, and J. Vandewalle, "A fast software implementation for arithmetic operations in GF(2 n )", Asiacrypt '96, ed. K. Kim et al., Lecture Notes in Computer Science, vol. 1163, Springer-Verlag (New York 1996) pp. 65–76] have considered the use of fields GF($(2^n)^m$), with a focus on n=16, m=11. This construction yields an extension field with $2^{176}$ elements. The advantage with this approach is that the subfield GF($2^{16}$) has a Cayley table of sufficiently small size to fit in the memory of a workstation.

Other workers have offered alternative approaches. Optimizations for multiplication and inversion in such composite fields of characteristic two are disclosed by Paar et al. [see J. Guajardo and C. Paar. "Efficient Algorithms for Elliptic Curve Cryptosystems", Advances in Cryptology—Crypto '97, ed. B. S. Kaliski, Lecture Notes in Computer Science, vol. 1294, Springer-Verlag (New York 1997), pp. 342–356]. Schroeppel et al. [see R. Schroeppel, H. Orman, S. O'Malley, and O. Spatscheck, "Fast key exchange with elliptic curve systems", Advances in Cryptology—CRYPTO '95, ed. J. Killian et al., Lecture Notes in Computer Science, vol. 963, Springer-Verlag (New York 1995) pp. 43–56] report an implementation of an elliptic curve analogue of Diffie-Hellman key exchange over GF($2^{155}$). The arithmetic is based on a polynomial basis representation of the field elements. De Win et al. [see E. De Win, S. Mister, B. Preneel, and M. Wiener, "On the Performance of Signature Schemes Based on Elliptic Curves", Algorithmic Number Theory, ed. J. F. Buhler, Lecture Notes in Computer Science, vol. 1423, Springer-Verlag (New York 1998) pp. 252–266] disclose a detailed implementation of elliptic curve arithmetic on a desktop personal computer using finite fields of the form GF(p) and GF($2^n$) with a focus on its application to digital signature schemes. For ECCs over prime fields, the De Win et al. construction uses projective coordinates to eliminate the need for inversion, along with a balanced ternary representation of the multiplier. Schnorr [see C. P. Schnorr, "Efficient signature generation by smart cards", Journal of Cryptology, 4(3):161–174, 1991] discloses a digital signature algorithm based on the finite field discrete logarithm problem. The disclosed algorithm is apparently adaptable for smart card implementations.

Paar and co-workers [see D. V. Bailey. "Optimal Extension Fields", MQP-Senior Thesis, Computer Science Department, Worcester Polytechnic Institute, (Worcester, Mass. 1998); D. V. Bailey and C. Paar, "Optimal Extension Fields for Fast Arithmetic in Public-Key Algorithms", Advances in Cryptology—CRYPTO '98, ed. H. Krawczyk, Lecture Notes in Computer Science, vol. 1462, Springer-Verlag (New York 1998) pp. 472–485] have recently introduced optimal extension fields (herein "OEF"s) and have provided performance statistics on high-end RISC workstations. Mihailescu [see P. Mihailescu, "Optimal Galois field bases which are not normal", Fast Software Encryption—FSE '97, 4th International Workshop, Jan. 20–22, 1997, Haifa, Israel, rump session paper] has disclosed an efficient algorithm for exponentiation in an OEF which leads to efficient implementation of cryptosystems based on the finite field discrete logarithm problem. Kobayashi et al. [see T. Kobayashi, H. Morita, K. Kobayashi, and F. Hoshino, "Fast Elliptic Curve Algorithm Combining Frobenius Map and Table Reference to Adapt to Higher Characteristic", Advances in Cryptography—EUROCRYPT '99, ed. J. Stem, Lecture Notes in Computer Science, vol. 1592, Springer-Verlag (New York 1999) pp. 176–189] have extended the work on OEFs and have reported sub-millisecond performance on high-end RISC workstations and an ECC performance of 1.95 milliseconds on a 400 MHz Pentium II.

Paar and co-workers [see D. V. Bailey and C. Paar, "Efficient Arithmetic in Finite Field Extensions with Application in Elliptic Curve Cryptography", Journal of Cryptology, 14(3):153–176 (2001)] recently introduced an adaptation of the Itoh-Tsujii inversion algorithm for OEFs which is utilized in the present invention.

As security requirements become more stringent, the computation requirements for long number arithmetic create certain impediments to the continued deployment of low cost smart cards which utilize low end microprocessors to their limited computational capabilities. Creation of a digital signature is frequently the most computationally intensive operation demanded of a typical smart card. In addition, with the proliferation of low cost embedded processors in personal digital assistants (PDAs), wireless devices, smart appliances, building monitors, street sensors, vehicles, equipment and machinery, there has been a growing concern for access security. Thus, it is advantageous to provide fast and efficient cryptographic computation methods which can overcome the hardware deficiencies of low cost microprocessors without requiring more costly microprocessors or additional coprocessor, cache or memory hardware.

SUMMARY OF THE INVENTION

Most cryptographic applications which make use of finite fields require fields with a relatively large cardinality which require relatively long bit lengths for representing elements in these fields. For example, ECC schemes are based on finite field lengths ranging from 130 to 512 bits whereas DL schemes require arithmetic with finite field elements approximately 768 to 4096 bits in length. Finite field arithmetic with such long numbers is generally computationally costly and time consuming, frequently creating a bottleneck for particular applications and microprocessors. In most ECC and DL schemes, multiplication in finite files is the crucial operation which dictates performance and computational times for a given microprocessor.

One object of the method of the present invention is to reduce the computational cost of finite field arithmetic on a microprocessor by accelerating multiplication in finite fields.

Another object of the present invention is to provide for rapid multiplication of two elements of a finite field GF ($p^m$) where "p" is a prime larger than 2 and "m" is an integer greater than 1. Such fields are commonly referred to as "odd characteristic extension fields" (or "OCEF"s herein) and their use in ECC and DL schemes have recently been adopted by the draft IEEE P1363 standard.

One other object of the present invention is to provide for fast finite field arithmetic wherein computationally costly subfield modular reductions may be minimized to reduce computation times.

Another object of the present invention is to employ a finite field computational method where an adaptation of Itoh and Tsujii's inversion algorithm is utilized for the group operation.

One other object of the present invention is to provide for implementation and acceptable computational performance of ECC and DL cryptosystems on low cost microprocessors having limited memory, speed and computational hardware capability.

The method of the present invention may be implemented on any n-bit microprocessor or coprocessor where $p<2^n$. In one preferred embodiment, an 8-bit microprocessor is employed. In one embodiment, the method is implemented on an 8-bit microprocessor and p<256. In a most preferred embodiment, the method of the present invention is implemented on any microprocessor or coprocessor device having intrinsic computational characteristics such that a modular reduction has a greater computational cost than double precision, long number additions or accumulations performed with said device The method of the present invention is not restricted to ECC or DL schemes but rather may be advantageously employed with other public-key schemes, for example hyperelliptic curve schemes, private-key schemes, for example block ciphers, cryptographic hash functions, error correction codes and any other applications which require finite field arithmetic.

DESCRIPTION OF THE PREFERRED EMBODIMENTS

1. Fast Finite Field Arithmetic Method

The method of the present invention provides for acceleration of multiplication in finite fields. More particularly, the method provides for fast multiplication of two elements of a finite field GF ($p^m$) with "p" being a prime number larger than 2 and m being an integer greater than 1. Such fields are referred to as "Odd Characteristic Extension Fields (herein "OCEF") and include both Optimal Extension Fields (herein "OEF") of the form $p=2^n-c$ and irreducible polynomials of the form $p(x)=x^{18}-k_0$. The method is most advantageously applied to any application where double precision, long number additions or accumulations have a lower computational cost than modulo reductions.

A summary of the innovative method is provided in this section with details of an example implementation which employs OEFs provided in later sections.

In an OCEF GF($p^m$), elements A and B are usually represented as m-tuples:

$$A \leftarrow (a_0, a_1, \ldots, a_{(m-1)})$$

$$B \leftarrow (b_0, b_1, \ldots, b_{(m-1)})$$

where the tuple coefficients $a_i$, $b_j$, $0 \leq i,j \leq (m-1)$, are elements of the field GF(p). There are various methods of performing field multiplication A×B of the two elements. The method depends in part of the field basis that is being chosen. Even though the method of the present invention may be advantageously employed with any field basis, for example polynomial basis or normal basis, for illustration purposes an example application of the method is provided below using a polynomial basis.

Polynomial bases appear to be the dominant bases choice in cryptographic applications and represent in excess of 90% of current implementations. In a polynomial basis, each field element is represented as a polynomial with a maximum degree of m−1:

$$A=(a_0+a_1 x+\ldots+a_{(m-1)}x^{(m-1)})$$

$$B=(b_0+b_1 x+\ldots+b_{(m-1)}x^{(m-1)})$$

Again, the coefficients $a_i$, $b_1$, $0 \leq i,j \leq (m-1)$, are elements of the field GF(p). One method of performing the field multiplication C=A·B is to first perform a conventional polynomial multiplication with intermediate coefficients $c'_k$, k=0, 1, . . . , 2m−2. Generally, current practice employs a conventional method of computing these coefficients using the following sum of products:

$$c'_0 = a_0 b_0 \bmod p$$

$$c'_1 = a_0 b_1 + a_1 b_0 \bmod p$$

$$\ldots$$

$$c'_{(2m-3)} = a_{(m-1)}b_{(m-2)} + a_{(m-2)}b_{(m-1)} \bmod p$$

$$c'_{(2m-2)} a_{(m-1)}b_{(m-1)} \bmod p$$

With such prior art methods, there are two important features that should be noted: 1) each sum of products must be reduced modulo the prime p; and 2) all known methods require that sum of products involving coefficients of A and B be computed.

Conventional methods of performing a field multiplication in polynomial bases are known in the art, for example, Karatsuba's method or by incorporating the reduction modulo the field polynomial in the computation of the $c_k'$ coefficients [see D. V. Bailey and C. Paar, Journal of Cryptology, 14(3):153–176 (2001)].

The conventional method of computing the sum of products which form the $c_k'$ coefficients is to perform a multiplication of two coefficients $a_i b_j$ immediately followed by a reduction modulo p. Then the next coefficient product is computed, it is reduced modulo p, and the two reduced products are then added, followed by another modulo reduction. For illustration purpose, the conventional method of computing $c'_1$ in the example above is as follows:

Step 1: Multiply: $c \leftarrow a_0 b_1$
Step 2: Reduce result: $c \leftarrow c \bmod p$
Step 3: Multiply: temp$\leftarrow a_1 b_0$
Step 4: Reduce result: temp$\leftarrow$temp mod p Step 5: Add intermediate results: c←c+temp
Step 6: Reduce sum: c←c mod p For sum of products with more than 2 terms, Steps 3–5 are applied repeatedly for multiplying and adding the products subsequent coefficient products $a_ib_j$. After the last step, the variable c contains the value $[a_0b_1+a_1b_0]$ mod p. The unreduced products in Step 1 and 3 have twice the bit lengths as the polynomial coefficients $a_i$ and $b_j$. This conventional method is popular since the intermediate results are quickly reduced modulo the prime p, which results in intermediate results which are again single bit lengths. For instance, if all $a_1$, $b_j$ coefficients and the prime p can all be represented by 8 bit, the products c and temp in Step 1 and 3 need 16 bit registers for representations, but after Step 2 and 4, respectively, the variables c and temp are reduced to 8 bit values. Examples of this conventional method are known in the art [see D. V. Bailey and C. Paar, Crypto '98, Lecture Notes in Computer Science, Vol. 1462, Springer-Verlag (New York 1998) pp. 472–485; D. V. Bailey and C. Paar, J. Cryptology, 14(3);153–176 (2001); and E. J. Lee et al., "Speed-up of $F_{pm}$ Arithmetic for Elliptic Curve Cryptosystem, Proc. ICISC '98, Seoul, Korea, pp. 81–91 (1998)].

Unlike these previous methods, the innovative method of the present invention uniquely provides a way to accelerate the computation of the sum of products. In contrast to conventional methods, the method of the present invention avoids performing a modulo reduction after every product computation by adding several unreduced intermediate products and then performing a modulo reduction on the sum of the intermediate products. For example, the computation of $c'_1$ as shown above may be accomplished with greater speed and efficiency by employing the innovative method of the present invention as follows:

Step 1: Multiply: c←$a_0b_1$
Step 2: Multiply: temp←$a_1b_0$
Step 3: Add intermediate results: c←c+temp
Step 4: Reduce sum: c←c mod p Although this new method has seemingly fewer steps, it is important to note the addition in Step 3 requires a double-precision arithmetic, which can be a relatively costly undertaking on certain microprocessors. In addition, for a sum of products with k product terms, up to k−1 double precision additions might be required. However, the key advantage of the present method over conventional methods is that it requires significantly fewer reductions modulo p. As demonstrated below and by Paar and co-workers [see A. D. Woodbury, D. V. Bailey and C. Paar, "Elliptic Curve Cryptography on Smart Cards without Coprocessors, *Smart Card Research and Advance Applications—CARDIS* 2000, IFIP, vol. 180, ed. J. Domingo-Ferner et al., Kluwer Academic (Boston 2000)], this innovative method provides a computational advantage for implementation on certain microprocessors where double precision additions or accumulations are computationally less costly than modulo reductions.

The method of the present invention may be applied to any other method of computing polynomial products, including but not limited to polynomial multiplication using the Karatsuba method or its variants, fast Fourier transforms, number theoretical transforms or other methods for computing convolutions.

1. Finite Field Selection

In order to implement an elliptic curve cryptosystem (ECC) or discrete logarithm cryptosystem (DLC), one must select a finite field in which to perform arithmetic calculations. In order to evaluate the computation method of the present invention, it is advantageous to compare finite field arithmetic performance offered by alternative types of finite fields which have been proposed for elliptic curve cryptosystems (ECCs). By way of example, the three finite fields selected for comparison purposes are:

1) binary fields $GF(2^n)$
2) even composite fields $GF((2^n)^m)$ and
3) odd characteristic extension fields $GF(p^m)$ for "p" a prime number greater than 2 and "m" and integer greater than 1.

A finite field is identified with the notation $GF(p^m)$ for "p" a prime and "m" a positive integer. It is well known that there exists a finite field for all primes p and positive rational integers "m". This field is isomorphic to $GF(p)[x]/(P(x))$, where $P(x)=x^m+\Sigma_{i=0}^{m-1}p_ix^i$, $p_i \in GF(p)$, is a monic irreducible polynomial of degree m over $GF(p)$. In the following treatment, a residue class will be identified with the polynomial of least degree in this class.

Various finite fields admit the use of different algorithms for arithmetic. It is well known in the art that the choices of p, m, and P(x) can have a dramatic impact on the performance of the ECC. In particular, there are generic algorithms for arithmetic in an arbitrary finite field and there are specialized algorithms which provide better performance in finite fields of a particular form. In the following, we briefly describe field types proposed for ECC.

a. Binary Fields

Implementers designing custom hardware for an ECC often choose p=2 and P(x) to be a trinomial or pentanomial. Such choices of irreducible polynomial lead to efficient methods for extension field modular reduction. We will refer to this type of field as a "binary field," in accordance with [see IEEE. Standard Specifications for Public Key Cryptography. Draft, IEEE P1363 Standard, 1999. working document]. The elements of the subfield GF(2) can be represented by the logical signals 0 and 1. In this way, it is both speed and area efficient to construct hardware circuits to perform the finite field arithmetic.

b. Even Composite Fields

In software, the choice of parameters varies considerably with the wide array of available microprocessors. Many authors have suggested the use of p=2 and m a composite number. In this case, the field $GF(2^m)$ is isomorphic to $GF((2^s)^r)$, for m=sr and we call this an "even composite" field." Then multiplication and inversion in the subfield $GF(2^s)$ can be efficiently performed by table look-up if s is not too large. In turn, these operations in the extension field $GF((2^s)^r)$ are calculated using arithmetic in the subfield. As in the binary field case, the irreducible polynomials for both the subfield and the extension field are chosen to have minimal weight. This approach can provide superior performance when compared to the case of binary fields. However, a recent attack against ECCs over composite fields [see P. Gaudry, F. Hess, and N. P. Smart, "Constructive and Destructive Facets of Weil Descent on Elliptic Curves", Technical Report HPL 2000-10, Hewlett Packard Co. (Palo Alto, 2000)] makes them inappropriate for use in practice.

c. Odd Characteristic Extension Fields (OCEFs)

In a preferred embodiment, the method of the present invention is advantageously employed with Odd Characteristic Extension Fields $GF(p^m)$ where "p" is a prime number greater than 2 and "in" is an integer greater than 1. In one alternative embodiment, a subset of OCEFs, Optimal Extension Fields (OEFs) are employed where "p" is a pseudo-Mersenne prime and "m" is chosen so that an irreducible binomial exists over $GF(p)$. In one preferred embodiment, OEFs are employed where p is chosen in the form $2^n \pm c$, where n and c are arbitrary positive rational integers [see D. V. Bailey and C. Paar, "Optimal Extension Fields for Fast Arithmetic in Public-Key Algorithms", Advances in Cryptology—CRYPTO '98, ed. H. Krawczyh, Lecture Notes in Computer Science, vol. 1462, Springer-Verlag (New York 1998) pp. 472–485]. In this case, one chooses p of appropriate size to use the multiply instructions available on the target microcontroller. In addition, m is chosen so that an irreducible binomial $P(x)=x^m-\omega$ exists.

d. Finite Field Comparative Performance

To address requirements for fast field arithmetic in an ECC implemented on a smart card, in one embodiment the three options for finite field arithmetic on a standard Intel 8051 running at 12 MHz are compared. Derivatives of the 8051 are utilized on many popular smart cards such as the Siemens 44C200 and Phillips 82C852. Due to the 8051's internal clock division factor of 12, one internal clock cycle is equivalent to one microsecond. Therefore, these timings may be interpreted as either internal clock cycles or microseconds. While this microprocessor platform was used for demonstration purposes, the method of the present invention may also be applied to alternative 8-bit, 16-bit and other microprocessors and coprocessors. In most preferred embodiments, the method is employed on a microprocessor or coprocessor where double precision, long number addition or accumulation has a lower computational cost than modulo reductions.

Extension field multiplication for the three finite field alternatives were implemented in assembly language. A field order of about $2^{135}$ was employed which provides moderate security as discussed below. Field multiplication is the time critical operation in most ECC realizations. Field elements were represented with a polynomial basis to take advantage of the standard arithmetic algorithms available for each. Results are shown in Table 1.

TABLE 1

Extension field multiplication performance on an Intel 8051

| Field | approx. Field Order | # Cycles for Multiply |
|---|---|---|
| $GF(2^{135})$ | $2^{135}$ | 19,600 |
| $GF((2^8)^{17})$ | $2^{136}$ | 7,479 |
| $GF((2^8-17)^{17})$ | $2^{134}$ | 5,084 |

As shown in Table 1, core field arithmetic operations in binary fields $GF(2^n)$ lag behind those of the even composite fields and OEFs at a ratio of 5:1. The computational arithmetic offered by OEFs and composite fields is comparable in performance. However, the recent results of Gaudry et al. [see P. Gaudry, F. Hess, and N. P. Smart, "Constructive and Destructive Facets of Weil Descent on Elliptic Curves", Hewlett Packard Technical Report HPL 2000-10 (Palo Alto 2000)] have demonstrated that the elliptic curve discrete logarithm problem can be easily solved when even composite fields are used. For these reasons, OCEFs and OEFs are the preferred finite field choices. The computational speed and efficiencies of the present inventive method are readily demonstrated by applying OEFs to the construction of ECCs to calculate a digital signature within a reasonable processing time with no need for hardware beyond an 8-bit microcontroller.

e. Finite Field Order Choice

Recently, Lenstra and Verheul have shown that under particular assumptions, 952-bit RSA and DSS systems may be considered to be of equivalent security to 132-bit ECC systems [see A. Lenstra and E. Verheul, "Selecting cryptographic key sizes", Public Key Cryptography—PKC 2000, ed. H. Imai et al., Lecture Notes in Computer Science, vol. 1751, Springer-Verlag (New York 2000) pp. 446–465]. The authors maintain that 132-bit ECC keys are adequate for commercial security in the year 2000. This assertion of commercial security is based on the hypothesis that a 56-bit block cipher offered adequate security in 1982 for commercial applications.

Similar security estimates have recently been confirmed by the breaking of the ECC2K-108 challenge [see R. Harley, D. Doligez, D. de Rauglaudre, and X. Leroy, http://cristal.inria.fr/%7Eharley/ecdl7/]. Since the field $GF((2^8-17)^{17}))$ has an order of about $2^{134}$, breaking the Koblitz (or anomalous) curve cryptosystem over $GF(2^{108})$ required slightly more effort than a brute force attack against DES. Hence, an ECC over a 134-bit field which does not use a subfield curve is by a factor of $\sqrt{108}\cdot\sqrt{26} \approx 2^{16}$ harder to break than the ECC2K-108 challenge or DES. Thus, based on current knowledge of EC attacks, the security of the example system demonstrated herein is roughly equivalent to a 72-bit block cipher. This implies that an attack would require about 65,000 times as much effort as breaking DES. In addition, it is worth noting that factoring the 512-bit RSA challenge took only about 2% of the time required to break DES or the ECC2K-108 challenge. This implies that an ECC over the proposed field $GF(239^{17})$ offers far more security than the 512-bit RSA system which has been popular for current smart card applications. In summary, the selection of field order used to demonstrate performance of the method of the present invention on a typical smart card microprocessor platform clearly provides medium-term security which is sufficient for many current smart card applications. Of course, this assumes that there are no special attacks against ECC over OEFs or OCEFs. This assumption seems to be valid at the present time [see P. Gaudry, F. Hess, and N. P. Smart, "Constructive and Destructive Facets of Weil Descent on Elliptic Curves", Technical Report HPL 2000-10, Hewlett Packard Co. (Palo Alto, 2000)].

To generate good elliptic curves over OEFs there are two preferred approaches. The first one is based on the use of a curve defined over GF(p) using the method of Blake and co-workers [see I. Blake, G. Seroussi, and N. Smart. Elliptic Curves in Cryptography. Cambridge University Press, 1999, Section VI.4]. The second, more general method uses the well-known Schoof's algorithm together with its improvements. The algebra package LiDIA v2.0.1 (Technische Universitat Darmstadt, Darmstadt, Germany ) supports EC point counting over arbitrary fields.

2. Example Algorithms: 8-Bit Microcontroller

When choosing an algorithm to implement on 8-bit processors, it is important that the parameter choices match the target platform. The Intel 8051 offers a multiply instruction which computes the product of two integers each less than $2^8=256$. Thus, we chose a prime $2^8-17=239$ as our field characteristic so that multiplication of elements in the prime subfield can use the ALU's multiplier. In addition, the nature of the OCEF or OEF leads to an efficient reduction method. For example, field elements may be represented as polynomials of degree up to 16, with coefficients in the prime subfield GF(239). As mentioned previously, the polynomial is reduced modulo an irreducible polynomial, $P(x)=x^m-\omega$. In this implementation $P(x)=x^{17}-2$.

The key performance advantage of OCEFs or OEFs is due to fast modular reduction in the subfield. Given a prime, p=$2^n$−c, reduction is performed by dividing the number x into two n-bit words. The upper bits of x are "folded" into the lower ones, leading to a very efficient reduction. The basic reduction step which reduces a 2n-bit value x to a result with 1:5n bits is given by representing x=$x_1 2^n + x_0$, where $x_0$, $x_1 < 2^n$. Thus a reduction is performed by:

$$x \equiv x_1 c + x_0 \bmod 2^n - c \qquad (1)$$

which takes one multiplication by c, one addition, and no divisions or inversions. As will be seen in the discussion of multiplication below, the reduction principle for OEFs is expanded for the example implementation described herein.

Calculating a multiplicative inverse over the 8-bit subfield is easily implemented with table look-up. There is a relative cost in increased code size, but the subfield inverse requires only two instructions. In contrast, a method such as the Extended Euclidean Algorithm would require a great deal more processing time. This operation is required for the example optimized inversion algorithm, as described below.

For elliptic curves, extension field multiplication is the most important basic operation. The elliptic curve group operation requires 2 multiplications, 1 squaring, 1 inversion, and a number of additions that are relatively fast compared with the first three operation types. Addition is carried out in the extension field by m−1 component-wise additions modulo p. Subtraction is performed in a similar manner. In the examples provided herein, squaring and inversion performance depends on the speed of multiplication. Therefore the speed of a single extension field multiplication defines the speed of the group operation in general.

a. Multiplication

In one preferred embodiment, extension field multiplication is implemented as polynomial multiplication with a reduction modulo the irreducible binomial P(x)=$x^{17}$−2. This modular reduction is implemented in an analogous manner to the subfield modular reduction outlined above. First, we observe that $x^m \equiv \omega \bmod x^m - \omega$. This observation leads to the general expression for this reduction, given by $$C(x) \equiv c'_{m-1} x^{m+1} + [\omega c'_{2m-2} + c'_{m-2}] x^{m-2} + \ldots + \qquad (2)$$
$$[\omega c'_{m+1} + c'_1] x + [\omega c'_m + c'_0] \bmod x^m - \omega.$$

Thus, product C of a multiplication A×B can be computed as shown in example Algorithm 1.1.

Extension field multiplication requires $m^2$ inner products $a_i b_j$, and m−1 multiplications by ω when the traditional textbook method for polynomial multiplication is used. These $m^2$+m−1 subfield multiplications form the performance critical part of a field multiplication. In earlier OEF work [see D. V. Bailey. "Optimal Extension Fields", MQP-Senior Thesis, Computer Science Department, Worcester Polytechnic Institute, (Worcester, Mass. 1998); D. V. Bailey and C. Paar, "Optimal Extension Fields for Fast Arithmetic in Public-Key Algorithms", *Advances in Cryptology—CRYPTO '98*, ed. K. Krawczyh, Lecture Notes in Computer Science, vol. 1462, Springer-Verlag (New York 1998) pp. 472–485], a subfield multiplication was performed as single-precision integer multiplication resulting in a double-precision product with a subsequent reduction modulo p. For OEFs with p=$2^n \pm c$, c>1, this approach requires 2 integer multiplications and several shifts and adds using Algorithm 14.47 as disclosed by Menezes [see A. J. Menezes, P. C. van Oorschot, and S. A. Vanstone. *Handbook of Applied Cryptography*. CRC Press, 1997]. A key innovation of the method of the present invention is to deviate from this approach.

Algorithm 1.1 Extension Field Multiplication

Require: A(x)=$\Sigma a_1 x^1$, B(x)=$\Sigma b_{1\,x}^{\,1} \in GF(239^{17})/P(x)$, where $P(x)=x^m - \omega$; $a_1$, $b^1 \in GF(239)$; $0 \leq i < 17$ Ensure: C(x)=$\Sigma c_k x^k$=A(x)B(x), $c_1 \in GF(239)$ First we calculate intermediate values for $c'_k$, k=17, 18, ..., 32.

$c'_{17} \leftarrow a_1 b_{16} + a_2 b_{15} + \ldots a_{14} b_3 + a_{15} b_2 + a_{16} b_1$ $c'_{18} \leftarrow a_2 b_{16} + a_3 b_{15} + \ldots a_{15} b_3 + a_{16} b_2$

. . .

$c'_{31} \leftarrow a_{15} b_{16} + a_{16} b_{15}$ $c'_{32} \leftarrow a_{16} b_{16}$ Now calculate $c_k$, k=0, 1, ..., 16.

$c_0 \leftarrow a_0 b_0 + \omega c'_{17} \bmod 239$ $c_1 \leftarrow a_0 b_1 + a_1 b_0 + \omega c'_{18} \bmod 239$

. . .

$c_{15} \leftarrow a_0 b_{15} + a_1 b_{14} + \ldots + a_{14} b_1 + a_{15} b_0 + \omega c'_{32} \bmod 239$ $c_{16} \leftarrow a_0 b_{16} + a_1 b_{15} + \ldots + a_{14} b_2 + a_{15} b_1 + a_{16} b_0 \bmod 239$ With the present method, only one reduction modulo p is performed per coefficient $c_k$, k=0, 1, ..., 16. This is achieved by allowing the residue class of the sum of integer products to be represented by an integer larger than p. The remaining task is to efficiently reduce a computation result which spreads over more than two words. Hence, the number of reductions can be reduced to m, while still requiring $m^2$+m−1 multiplications.

During the inner product calculations, all required multiplications are performed for a resulting coefficient, a multi-word integer is accumulated, and then a reduction is performed. The derivation of the maximum value for the multi-word integer $c_k$ before reduction is shown in Table 2.

TABLE 2

| Inner product maximum value |
|---|
| 1) one inner product multiplication with a maximum value of $(p-1)^2$ |
| 2) 17 products are accumulated, 16 of which are multiplied by ω = 2 |
| 3) $ACC_{max}$ = 33$(p-1)^2$ = 1869252 = 1C85C4h < $2^{21}$ |

The basic OEF reduction shown in Equation (1) may be expanded for multiple words. As the $\log_2(ACC_{max})$=21 bits, the number can be represented in the radix $2^8$ with three digits. One observes $2^n \equiv c \pmod{2^n - c}$ and $2^{2n} \equiv c^2 \pmod{2^n - c}$. Thus the expanded reduction for operands of this size is performed by representing x=$x_2 2^{2n} + x_1 2^n + x_0$, where $x_0$, $x_1$, and $x_2 < 2^n$. The first reduction is performed as $$x' \equiv x_2 c^2 + x_1 c + x_0 \pmod{2^n - c} \qquad (3)$$

noting that $c^2$=289≡50 mod 239. The reduction is repeated, now representing the previous result as x'=$x'_1 2n + x'_0$, where $x'_0$, $x'_1 < 2^n$. The second reduction is performed as $$x'' \equiv x'_1 c + x'_0 \bmod 2^n - c. \qquad (4)$$

The maximum intermediate values through the reduction are shown in Table 3. Step 1 shows the maximum sum after inner product addition. While this value is the largest number that will be reduced, it is more important to find the maximum value that can result from the reduction. This case can be found by maximizing $x_1$ and $x_0$ at the cost of reducing $x_2$ by one. Looking at Table 3 again, this value is shown in step 2, as is the resulting reduced value. The process is repeated again in steps 3 and 4, giving us the maximum reduced value after two reductions.

TABLE 3

Intermediate reduction maxima

1) Using Equation (3), given that $0 \leq x \leq 1C85C4h$
2) $\max(x') = 1734 h$, when $x = 1BFFFFh$.
3) Using Equation (4), given that $0 \leq x' \leq 1734h$
4) $\max(x'') = 275h$, when $x' = 16FFh$.

Note that through two reductions, a 21-bit input is reduced to 13 bits, and finally to 10 bits. At this point in the reduction, the same reduction could be performed again, but it would only provide a slight improvement. Adding $x''_1 c +x''_0$ would result in a 9-bit number. Therefore it is much more efficient to handle each possible case. It is most important to eliminate the two high bits and then to ensure the resulting 8-bit number is the least positive representative of its residue class. The entire multiplication and reduction is shown in example Algorithm 1.2.

To perform the three-word reduction requires three 8-bit multiplications and then several comparative steps. After the first two multiplications, the inner product sum has been reduced to a 13-bit number. If each inner product were to be reduced individually, every step starting at line 13 in example Algorithm 1.2 would be required. Ignoring the trailing logic, which would add quite a bit of time itself, this would require m=17 multiplications as opposed to the three required in example Algorithm1.2. By allowing the inner products to accumulate and performing a single reduction, 14 multiplications plus additional time in trailing logic are saved per coefficient calculation. Since 17 coefficient calculations are required per extension field multiplication, this method provides for enhanced computational efficiency and speed.

Algorithm 1.2 Extension Field Multiplication with Subfield Reduction

Require: $A(x) = \Sigma a_1 x^1, B(x) = \Sigma b_1 x^1 \in GF(239^{17})/P(x)$, where $P(x) = x^m - \omega; a_1, b^1 \in GF(239); 0 \leq i < 17$ Ensure: $C(x) = \Sigma c_k x^k = A(x)B(x), c_k \in GF(239)$

```
1: Define z[w] to mean the w-th 8-bit word of z
2: c₁ ← 0
3: if i ≠ 6 = 16 then
4:     for j ← m − 1 down to k + 1 do
5:         c₁ ← c₁ + a₁₊ₘ₋ⱼbⱼ
6:     end for
7:     c₁ ← 2c₁                            multiply by ω = 2
8: end if
9: for j ← i down to 0 do
10:    c₁ ← c₁ + a₁₋ⱼbⱼ
11: end for
12: c₁ ← c₁[2]*50 + c₁[1]*17 + c₁[0]      begin reduction, Equation (3)
```

-continued

```
13: t ← c₁[1]*17                           begin Equation (4)
14: if t ≥ 256 then
15:     t ← t[0] + 17
16: end if
17: c₁ ← c₁[0] + t                         end Equation (4)
18: if c₁ ≥ 256 then
19:     c₁ ← c₁[0] + 17
20: if c₁ ≥ 256 then
21:         c₁ ← c₁[0] + 17
22:         terminate
23:     end if
24: end if
25: c₁ ← c₁ − 239
26: if c₁ ≤ 0 then
27:     c₁ ← c₁ + 239
28: end if
``` b. Squaring

Extension field squaring is similar to multiplication, except that the two inputs are equal. By modifying the standard multiplication routine, one is able to take advantage of identical inner product terms. For example, $c_2=a_0b_2+a_1b_1+a_2b_0+\omega c_{19}$, can be simplified to $c_2=2a_0a_2+a_1^2+\omega c_{19}$. Further gain is accomplished by doubling only one coefficient, reducing it, and storing the new value. This approach avoids the step of recalculating the doubled coefficient when it is needed again. An additional benefit with this approach is that the maximum inner product value is slightly lower. The exact inner product maximum is $177F8h$, but this makes little difference to the reduction algorithm. After two general OEF reductions, the maximum is reduced to $242h$. As this is still a 10-bit number, the next reduction steps would be identical to their multiplication counterparts, and therefore the same reduction code is used.

c. Inversion

Inversion in the OEF is performed via a modification of the Itoh-Tsujii algorithm [see T. Itoh and S. Tsujii, "A fast algorithm for computing multiplicative inverses in GF(2 m) using normal bases", *Information and Computation*, 78:171–177, 1988] as disclosed in the method Paar and co-workers which reduces the problem of extension field inversion to subfield inversion [see D. V. Bailey and C. Paar, "Efficient Arithmetic in Finite Field Extensions with Application in Elliptic Curve Cryptography", *Journal of Cryptology*, 14(3):153–176 (2001)]. The algorithm computes an inverse in $GF(p^{17})$ as $A^{-1}=(A^r)^{-1}A^{r-1}$ where $r=(p^{17}-1)/(p-1)=11 \ldots 10_p$. Example Algorithm 1.3 provides details of this method. A key point is that $A^r \in GF(p)$ and is therefore an 8-bit value. Therefore the step shown in line 10 is only a partial extension field multiplication, as all coefficients of $A^r$ other than $b_0$ are zero. Inversion of $A^r$ in the 8-bit subfield is performed via a table look-up.

The most costly operation is the computation of $A^r$. Because the exponent is fixed, an addition chain can be derived to perform the exponentiation. For m=17, the addition chain requires 4 multiplications and 5 exponentiations to a $p^1$-th power. The element is then inverted in the subfield, and then multiplied back in. This operation results in the field inverse.

The Frobenius map raises a field element to the p-th power. In practice, this automorphism is evaluated in an OEF by multiplying each coefficient of the element's polynomial representation by a "Frobenius constant," determined by the field and its irreducible binomial. A list of the constants used in one preferred embodiment is shown in Table 4. To raise a given field element to the $p^i$-th power, each $a_j$, j=0, 1, ..., 16, coefficient are multiplied by the corresponding constant in the subfield GF(239).

This approach provides efficient methods for both the exponentiation and subfield inversion required in Algorithm 1.3. As shown in the results below (see Table 7) the ratio of multiplication time to inversion time is 1:4.8. This ratio indicates that an affine representation of the curve points offers better performance than the corresponding projective-space approach, which eliminates the need for an inversion in every group operation at the expense of many more multiplications.

TABLE 4

Frobenius constants $B(x) = A(x)^{p^i}$

| Coefficient | Exponent | | | |
|---|---|---|---|---|
| | p | $p^2$ | $p^4$ | $p^8$ |
| $a_0$ | 1 | 1 | 1 | 1 |
| $a_1$ | 132 | 216 | 51 | 211 |
| $a_2$ | 216 | 51 | 211 | 67 |
| $a_3$ | 71 | 22 | 6 | 36 |
| $a_4$ | 51 | 211 | 67 | 187 |
| $a_5$ | 40 | 166 | 71 | 22 |
| $a_6$ | 22 | 6 | 36 | 101 |
| $a_7$ | 36 | 101 | 163 | 40 |
| $a_8$ | 211 | 67 | 187 | 75 |
| $a_9$ | 128 | 132 | 216 | 51 |
| $a_{10}$ | 166 | 71 | 22 | 6 |
| $a_{11}$ | 163 | 40 | 166 | 71 |
| $a_{12}$ | 6 | 36 | 101 | 163 |
| $a_{13}$ | 75 | 128 | 132 | 216 |
| $a_{14}$ | 101 | 163 | 40 | 166 |
| $a_{15}$ | 187 | 75 | 128 | 132 |
| $a_{16}$ | 67 | 187 | 75 | 128 |

Algorithm 1.3 Inversion Algorithm in $GF((2^8-17)^{17})$
Require: $A \in GF(p^{17})$
Ensure: $B \equiv A^{-1} \mod P(x)$
1: $B_0 \leftarrow A^p = A^{(10)_p}$
2: $B_1 \leftarrow B_0 A = A^{(11)_p}$
3: $B_2 \leftarrow (B_1)^{p^2} = A^{(1100)_p}$
4: $B_3 \leftarrow B_2 B_1 = A^{(1111)_p}$
5: $B_4 \leftarrow (B_3)^{p^4} = A^{(11110000)_p}$
6: $B_5 \leftarrow B_4 B_3 = A^{(11111111)_p}$
7: $B_6 \leftarrow (B_5)^{p^8} = A^{(1111111100000000)_p}$
8: $B_7 \leftarrow B_6 B_5 = A^{(1111111111111111)_p}$
9: $B_8 \leftarrow (B_7)^p = A^{(11111111111111110)_p}$
10: $b \leftarrow B_8 A = A^{r-1} A = A^r$
11: $b \leftarrow b^{-1} = (A^r)^{-1}$
12: $B \leftarrow b B_8 = (A^r)^{-1} A^{r-1} = A^{-1}$ d. Group Operation The operation in the Abelian group of points on an elliptic curve is called "point addition." This operation adds two curve points, and results in another point on the curve. Using an ECC for signatures involves the repeated application of the group law. The group law using affine coordinates is shown below [see A. J. Menezes. *Elliptic Curve Public Key Cryptosystems*. Kluwer Academic (Boston 1993)].

If $P=(x_1, y_1) \in GF(p^m)$, then $-P=(x_1, -y_1)$. If $Q=(x_2, y_2) \in GF(p^m)$, $Q \neq -P$, then $P+Q=(x_3, y_3)$, where $$x_3 = \lambda^2 - x_1 - x_2 \quad (5)$$

$$y_3 = \lambda(x_1 - x_3) - y_1 \quad (6)$$

$$\lambda = \begin{cases} \dfrac{y_2 - y_1}{x_2 - x_1}, & \text{if } P \neq Q \\ \dfrac{3x_1^2 + a}{2y_1}, & \text{if } P = Q \end{cases} \quad (7)$$

The $\lambda$ term is calculated depending on the relationship of P and Q. If they are equal, then a point doubling is performed, using the second equation. Note that $\lambda$ is undefined if the points are additive inverses, or if either point is zero. These conditions must be examined before the group operation is performed.

e. Point Multiplication

The operation required in an ECC is point multiplication, denoted by kP, where k is an integer and P is a point on the curve. For large k, computing kP is a costly endeavor. However, well-studied techniques used for ordinary integer exponentiation can be advantageously applied. The most basic of these algorithms is the binary-double-and-add algorithm [see D. E. Knuth. *The Art of Computer Programming. Volume 2: Semi-numerical Algorithms*, 2nd ed., Addison-Wesley (Reading, Mass. 1981)]. It has a complexity of $\log_2(k)+H(k)$ group operations, where H is the Hamming weight of the multiplier k. Thus, on average one can expect this algorithm to require 1:5 $\log_2(k)$ group operations. Using more advanced methods, such as signed digit, k-ary or sliding window, the complexity may be reduced to approximately 1:2 $\log_2(k)$ group operations on average [see A. J. Menezes, P. C. van Oorschot, and S. A. Vanstone. *Handbook of Applied Cryptography*. CRC Press, 1997].

The situation is much better in certain applications, however. The most common public-key operation for a smart card is to provide a digital signature. The ECDSA algorithm [see "Standard Specifications for Public Key Cryptography", IEEE P1363 Draft Standard, IEEE 1999] involves the multiplication of a public fixed curve point by the user generated private key as the core operation. Because the curve point is known ahead of time, precomputations may be performed to expedite the signing process. Using a method devised by de Rooij [see P. de Rooij, "Efficient exponentiation using precomputation and vector addition chains", *Advances in Cryptography—EUROCRYPT '98*, ed. K. Nyberg, Lecture Notes in Computer Science, vol. 1403, Springer-Verlag, (New York 1998) pp. 389–399], one can reduce the number of group operations necessary by a factor of four over the binary-double-and-add algorithm. The de Rooij algorithm is a variant of that devised by Brickell, Gordon, McCurley, and Wilson but requires far fewer precomputations [see E. F. Brickell, D. M. Gordon, K. S. McCurley, and D. B. Wilson, "Fast exponentiation with precomputation", *Advances in Cryptography—EUROCRYPT '92*, ed. R. A. Rueppel, Lecture Notes in Computer Science, vol. 1440, Springer-Verlag (New York 1993) pp. 200–207].

Algorithm1.4 EC Fixed Point Multiplication using Precomputation and Vector Addition Chains
Require: $\{b^0 A, b^1 A, \ldots, b^t A\}$, $A \in E(GF(p^m))$, and $s = \sum_{i=0}^{t} s_i b^i$
Ensure $C = sA$, $C \in E(GF(p^m))$
1: Define $M \in [0, t]$ such that $z_M \geq z_i$ for all $0 \leq i \leq t$
2: Define $N \in [0, t]$, $N \neq M$ such that $Z_N \leq z_i$ for all $0 \leq i \leq t$, $i \neq M$
3: for $i \leftarrow 0$ to t do

-continued

```
4:    A₁ ← b¹A
5:    z₁ ← s¹
6: end for
7: Determine M and N for {z₀, z₁, . . . , z_t}
8: while Z_N ≥ 0 do
9:    q ← ⌊Z_M/Z_N⌋
10:   A_N ← qA_M + A_N              general point multiplication
11:   Z_M ← Z_M mod Z_N
12: Determine M and N for f {z₀, z₁, . . . , z_t}
13: end while
14: C ← Z_M A_M
```

A modified form of de Rooij is shown in example Algorithm 1.4. Note that the step shown in line 10 requires general point multiplication of AM by q, where $0 \leq q < b$. This is accomplished using the binary-double-and-add algorithm. de Rooij notes that during execution, q is rarely greater than 1 [see P. de Rooij, "Efficient exponentiation using precomputation and vector addition chains", *Advances in Cryptography—EUROCRYPT '98*, ed. K. Nyberg, Lecture Notes in Computer Science, vol. 1403, Springer-Verlag, (Boston 1998) pp. 389–399].

The choice of t and b are very important to the operation of this example algorithm. They are defined such that $b^{t+1} \geq \epsilon E(GF(p^m))$. The algorithm must be able to handle a multiplier s not exceeding the order of the elliptic curve. The number of point precomputations and temporary storage locations is determined by t+1, while b represents the maximum size of the exponent words. Thus we need to find a compromise between the two parameters.

Two obvious choices for an 8-bit architecture are $b=2^{16}$ and $b=2^8$ since dividing the exponent into radix b words is essentially free as they align with the memory structure. This results in a precomputation count of 9 and 18 points, respectively. The tradeoff here is the cost of memory access versus arithmetic speeds. As shown by de Rooij, as the number of precomputed points is doubled, the algorithm operates only marginally faster but the arithmetic operations are easier to perform on the 8-bit microcontroller. The problem is that the time to access such large quantities of data, 34 bytes per precomputed point and storage location in external RAM (XRAM), adds up. Note that even though the XRAM may be physically internal to the microcontroller, it is outside the natural address space and a time delay is incurred for access.

For $b=2^{16}$, 16-bit multiplication and modular reduction must be performed, but only 9 precomputed points and 9 temporary points need to be stored. For $b=2^8$, only 8-bit multiplication and modular reduction must be performed but now 18 precomputed points and 18 temporary points must be stored. As shown below (see Table 8), implementation results indicate that the speed gain from doubling the precomputations and the faster 8-bit arithmetic slightly outweighs the cost of the increase in data access assuming a microcontroller with enough XRAM is available.

3. Example ECC Implementation

Implementing ECCs on the Intel 8051 family of microcontrollers is a challenging task. The processor has only 256 bytes of internal RAM available, and only the lower 128 bytes are directly addressable. The upper 128 bytes must be referenced through the use of the two pointer registers: R0 and R1. Accessing this upper half takes more time per operation and incurs more overhead in manipulating the pointers. To make matters worse, the lower half of the internal RAM must be shared with the system registers and the stack, thus leaving fewer memory locations free. While XRAM may be utilized, there is essentially only a single pointer for these operations which are at typically at least three times slower than their internal counterparts.

As shown in Table 5, the 8051 memory configuration and limitations makes this microprocessor a tight fit for an ECC implementation. Each curve point in our group occupies 34 bytes of RAM, 17 bytes each for the X and Y coordinates. To make the system as fast as possible, the most intensive field operations, such as multiplication, squaring, and inversion, operate on fixed memory addresses in the faster, lower half of RAM. During a group operation, the upper 128 bytes are divided into three sections for the two input and one output curve points, while the available lower half of RAM is used as a working area for the field arithmetic algorithms. A total of four 17-byte coordinate locations are used, starting from address 3Ch to 7Fh, the top of lower RAM. Six bytes, located from 36h to 3Bh, are used to keep track of the curve points, storing the locations of each curve point in the upper RAM. Using these pointers, we can optimize algorithms that must repeatedly call the group operation, often using the output of the previous step as an input to the next step. Instead of copying a resulting curve point from the output location to an input location, which involves using pointers to move 34 bytes around in upper RAM, one can simply change the pointer values and effectively reverse the inputs and outputs of the group operation.

TABLE 5

Internal RAM memory allocation

| Address | Function |
| --- | --- |
| 00–07h | Registers |
| 08–14h | de Rooij Algorithm Variables |
| 15–35h | Call Stack (variable size) |
| 36–3Bh | Pointers to Curve Points in Upper RAM |
| 3C–7Fh | Temporary Field Element Storage |
| 80–E5h | Temporary Curve Point Storage |
| E6–FFh | Unused |

The arithmetic components are all implemented in handwritten, loop-unrolled assembly language. As shown below (see Table 7), this results in large, but fast and efficient program code. Note that the execution times are nearly identical to the code size, an indication of their linear nature. Each arithmetic component is written with a clearly defined interface, making them completely modular. Thus, a single copy of each component exists in the final program, as each routine is called repeatedly.

Extension field inversion is constructed using a number of calls to the other arithmetic routines. The group operation is similarly constructed, albeit with some extra code for point equality and inverse testing. The binary-double-and-add and de Rooij algorithms were implemented in C, making calls to the group operation assembly code when needed. Looping structures were used in both programs as the overhead incurred is not as significant as it would be inside the group operation and field arithmetic routines. The final size and architecture requirements for the programs are shown in Table 6.

4. Implementation Results

The results shown in Table 7 were obtained with a the Siemens SLE44C24S microcontroller, an 8051 derivative with 26 kilobytes of ROM, 2 kilobytes of EEPROM, and 512 bytes of XRAM. This XRAM is in addition to the internal 256 bytes of RAM, and its use incurs a much greater delay. However, this extra memory is crucial to the operation of the de Rooij algorithm which requires the manipulation of several precomputed curve points.

TABLE 6

Program size and architecture requirements

| Type | Size (bytes) | Function |
| --- | --- | --- |
| Code | 13k | Program Storage |
| Internal RAM | 183 | Finite Field Arithmetic |
| External RAM | 306 | Temporary Points |
|  | 34 | Integer Multiplicand |
| Fixed Storage | 306 | Procomputed Points |

TABLE 7

Finite field arithmetic performance on a 12 MHz 8051

| Description | Operation | Time[a] ($\mu$ sec) | Code Size (bytes) |
| --- | --- | --- | --- |
| Multiplication | $C(x) = A(x)B(x)$ | 5084 | 5110 |
| Squaring | $C(x) = A^2(x)$ | 3138 | 3259 |
| Addition | $C(x) = A(x) + B(x)$ | 266 | 230 |
| Subtraction | $C(x) = A(x) - B(x)$ | 230 | 256 |
| Inversion | $C(x) = A^{-1}(x)$ | 24489 | [b] |
| Scalar Mult. | $C(x) = sA(x)$ | 642 | 666 |
| Scalar Mult. by 2 | $C(x) = 2A(x)$ | 180 | 257 |
| Scalar Mult. by 3 | $C(x) = 3A(x)$ | 394 | 412 |
| Frobenius Map | $C(x) = A^p(x)$ | 625 | 886 |
| Partial Multiplication | $c_0$ of $A(x)B(x)$ | 303 | 305 |
| Subfield Inverse | $c = a^{-1}$ | 4 | 236 |

[a]Time calculated averaging over at least 5,000 executions with random inputs.
[b]Inversion is a collection of calls to the other routines and has negligible size itself.

TABLE 8

Elliptic curve performance on a 12 MHz 8051

| Operation | Method | Time (msec) |
| --- | --- | --- |
| Point Addition |  | 39.558 |
| Point Double |  | 43.025 |
| Point Multiplication | Binary Method | 8370 |
| Point Multiplication | de Rooij w/9 precomp. | 1950 |
| Point Multiplication | de Rooij w/18 precomp. | 1830 |

Keil PK51 tools (Keil Software, Inc., Plano, Tex.) were used to assemble, debug and time the algorithms, since we did not have access to a simulator for the Siemens smart card micro-controllers. Thus, to perform timing analysis a generic Intel 8051 was used, running at 12 MHz. Given the optimized architecture of the Siemens controller, an SLE44C24S running at 5 MHz is roughly speed equivalent to a 12 MHz Intel 8051.

Using each of the arithmetic routines listed in Table 7, the elliptic curve group operation takes 39.558 msec per addition and 43.025 msec per doubling on average. Using random exponents, a speed of 8.37 seconds for point multiplication using binary-double-and-add was achieved. This is exactly what would be predicted given the speed of point addition and doubling. If one fixes the curve point and uses the de Rooij algorithm discussed previously, speeds of 1.95 seconds and 1.83 seconds are achieved for 9 and 18 pre-computations respectively. This is a speed up factor of well over 4:1 when compared to general point multiplication. In this example, the SLE44C24S microcontroller had only 512 bytes of XRAM for manipulating precomputed points. Since 34 bytes are required per precomputed point, 18 temporary points will not fit in the XRAM and one is limited to 9 temporary points on this microcontroller. Performance results are summarized in Table 8.

As shown in Table 8, a scalar multiplication of a fixed point of an elliptic curve can be performed in under 2 seconds on an 8051 microcontroller. This is the core operation for signature generation in the ECDSA scheme. Although the performance and security threshold may not allow the use of our implementation in all smart card applications, there are numerous scenarios where these parameters offer an attractive alternative to more costly smart cards with coprocessors especially if public-key capabilities are added to existing systems.

In alternative embodiments, a smart card with an 8051-derived microcontroller that can be clocked faster than the 5 MHz can easily yield point multiplication times which are below one second. In addition, 16-bit smart card microcontrollers such as the Siemens SLE66C80S would allow for a larger subfield and smaller extension degree, thus reaping immense benefits in field arithmetic algorithms. Furthermore, the use of an elliptic curve defined over the prime subfield, as suggested by Tetsutaro and co-workers, may provide additional performance enhancements [see Tetsutaro Kobayashi, Hikaru Morita, Kunio Kobayashi, and Fumitaka Hoshino, "Fast Elliptic Curve Algorithm Combining Frobenius Map and Table Reference to Adapt to Higher Characteristic", *Advances in Cryptography—EUROCRYPT '99*, ed. J. Stern, Lecture Notes in Computer Science, vol. 1592, Springer-Verlag (New York 1999) pp. 176–189]. Each of these potential improvements provides further possibilities to apply the fast field arithmetic provided by an OCEFs or OEFs to construct elliptic curve cryptosystems on smart card microcontrollers without additional coprocessors.

Having described the preferred embodiments of the invention, it will now become apparent to one skilled in the art that other embodiments incorporating the disclosed concepts may be used. Therefore, it is not intended to limit the invention to the disclosed embodiments but rather the invention should be limited only by the spirit and scope of the following claims.

What is claimed is:

1. A method for finite field multiplication of odd characteristic extension fields with a microcontroller comprising the steps of:
providing a microcontroller comprised of
a central processing unit (CPU) having an arithmetic and logical unit (ALU);
a multiplier module;
an addition module;
a division module; and
memory locations comprising internal random access memory (RAM) and external random access memory (XRAM);
selecting a basis representation of field elements;
providing at least two field elements A and B in a field GF ($p^m$) represented as m-tuples where p>2, m>1, A is represented as an first array of integer coefficients ($a_0$, $a_1$, ... $a_i$, ... $a_{(m-1)}$), B is represented as second array of integer coefficients ($b_0$, $b_1$, ... $b_j$, ... $b_{(m-1)}$) and the tuple coefficients $a_i$ and $b_j$ are elements of the field GF(p) where $0 \leq i$, $j \leq (m-1)$;
storing said first array in a first memory location;
storing said second array in a second memory location;

multiplying the two field elements A and B with said multiplier module to produce a product C in a field GF ($p^m$) where C is represented as a third array of integer coefficients ($c_0, c_1, \ldots c_k, \ldots c_{(m-1)}$, and tuple coefficients $c_k$ are elements of the field GF(p) where $0 \leq k \leq (m-1)$;

storing said third array in a third memory location;

computing m temporary coefficients $c_k'$ as a sum of m intermediate products without an immediate modular reduction where $$\sum_0^{m-1} c_k' = \sum_{i+j=k} a_i \cdot b_j;$$

and said intermediate products $a_i \cdot b_j$ are computed with said multiplier module;

adding said intermediate products for each of temporary coefficient $c_k'$ with said addition module;

storing said temporary coefficients $c_k'$ in either a fourth memory location or said first, said second or said third memory locations;

computing m coefficients $c_k$ with said multiplier, addition and division modules by performing a single modular reduction on each of said temporary coefficients $c_k'$; and storing the coefficients $c_k$ in either said first, said second, said third or said fourth memory location.

2. The method of claim 1 where said field basis representation comprises a polynomial basis and each field element is represented as a polynomial with a maximum degree of m−1.

3. The method of claim 1 wherein said multiplication is performed on an n-bit microcontroller an p is less than $2^n$.

4. The method of claim 1 wherein said multiplication is performed on an 8-bit microcontroller.

5. The method of claim 1 wherein said multiplication is performed on an 8-bit microcontroller and p is less than 256.

6. The method of claim 1 wherein said multiplication is performed on a microcontroller device having intrinsic computational characteristics such that a modular reduction has a greater computational cost than double precision, long number additions or accumulations performed with said device.

7. The method of claim 6 wherein said device is an n-bit microcontroller and p is less than $2^n$.

8. The method of claim 6 wherein said device is an 8-bit microcontroller.

9. The method of claim 6 wherein said device is and 8-bit microcontroller and p is less than 256.

10. The method of claim 1 wherein said multiplication method is used for computing polynomial products selected from the group consisting of the Karatsuba method and its variants, Fast Fourier Transforms, number theoretical transforms or other methods for computing convolutions.

11. A system for finite field multiplication of odd characteristic extension comprising:

a microcontroller having memory locations comprising internal random access memory (RAM) and external random access memory (XRAM);

a basis representation of field elements;

at least two field elements A and B in a field GF ($p^m$) represented as m-tuples where p>2, >m>1, A is represented as an first array of integer coefficients ($a_0, a_1, \ldots a_i, \ldots a_{(m-1)}$), B is represented as second array of integer coefficients ($b_0, b_1, \ldots b_j, \ldots b_{(m-1)}$) and the tuple coefficients $a_i$ and $b_j$ are elements of the field GF(p) where $0 \leq i, j \leq (m-1)$;

a first memory location for storing said first array;

a second memory location for storing said second array;

a multiplier module for multiplying the two field elements A and B to produce a product C in a field GF ($p^m$) where C is represented as a third array of integer coefficients ($c_0, c_1, \ldots c_k, \ldots c_{(m-1)}$, and tuple coefficients $c_k$ are elements of the field GF(p) where $0 \leq k \leq (m-1)$;

a third memory location for storing said third array;

a multiplier module for computing intermediate products $a_i \cdot b_j$;

an addition model for computing m temporary coefficients $c_k'$ as a sum of m intermediate products without an immediate modular reduction where $$\sum_0^{m-1} c_k' = \sum_{i+j=k} a_i \cdot b_j;$$

a fourth memory location for storing said temporary coefficients $c_k'$;

an arithmetic module for computing m coefficients $c_k$ with said multiplier, addition and division modules by performing a single modular reduction on each of said temporary coefficients $c_k'$; and a fifth memory location for storing the coefficients $c_k$.

12. The system of claim 11 where said field basis representation comprises a polynomial basis and each field element is represented as a polynomial with a maximum degree of m−1.

13. The system of claim 11 wherein said microcontroller is an n-bit microcontroller and p is less than $2^n$.

14. The system of claim 11 wherein said microcontroller is an 8-bit microcontroller.

15. The system of claim 11 wherein said microcontroller is an 8-bit microcontroller and p is less than 256.

16. The system of claim 11 wherein said microcontroller has intrinsic computational characteristics such that a modular reduction has a greater computational cost than double precision, long number additions or accumulations performed with said device.

17. The system of claim 16 wherein said device is an n-bit microcontroller and p is less than $2^n$.

18. The system of claim 16 wherein said device is an 8-bit microcontroller.

19. The system of claim 16 wherein said device is and 8-bit microcontroller and p is less than 256.

20. The system of claim 11 further comprising a computed polynomial product selected from the group consisting of the Karatsuba method and its variants, Fast Fourier Transforms, number theoretical transforms or other methods for computing convolutions.

* * * * *